E. J. FROST & G. A. LAWRENCE.
ELECTRIC GAS LIGHTING DEVICE.
No. 9,981. Reissued Dec. 20, 1881.
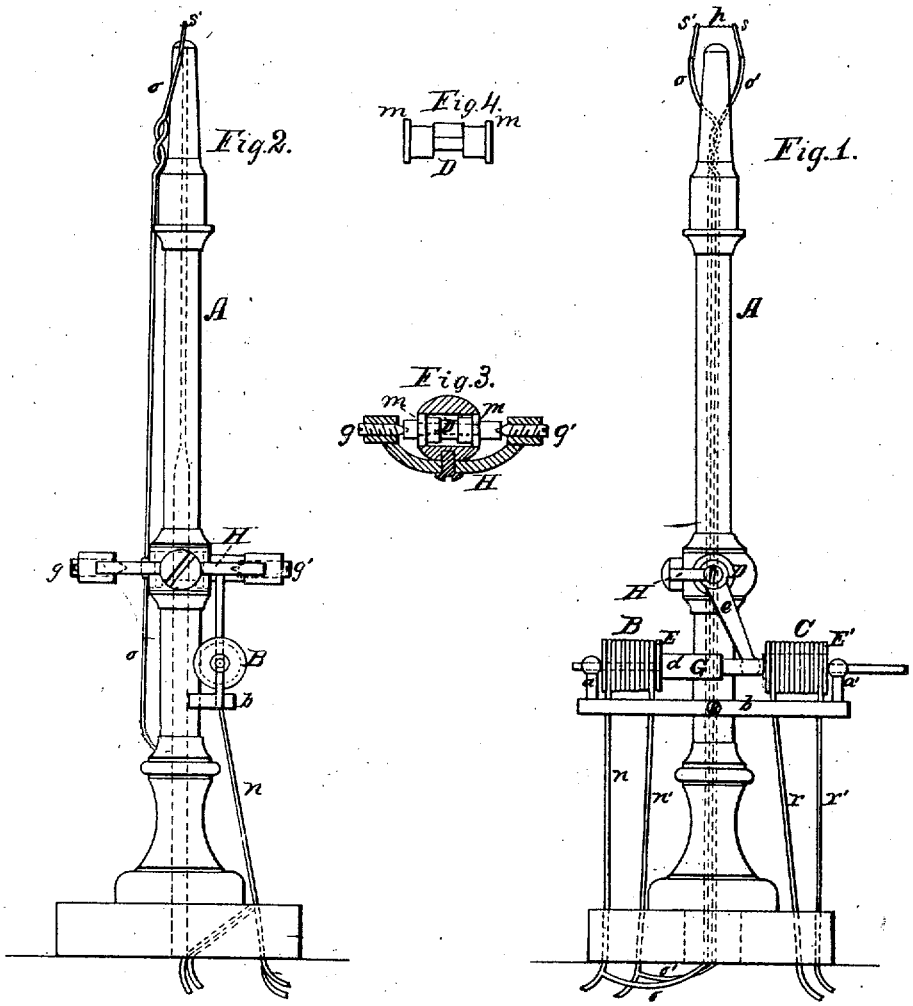
Witnesses,
W. S. Hale
Phil W. Hale
Inventors,
Edward J. Frost,
George A. Lawrence,
by Fred W. Royce,
Attorney

UNITED STATES PATENT OFFICE.

EDWARD J. FROST, OF PHILADELPHIA, PENNSYLVANIA, AND GEORGE A. LAWRENCE, OF NEW YORK, N. Y.

ELECTRIC GAS-LIGHTING DEVICE.

SPECIFICATION forming part of Reissued Letters Patent No. 9,981, dated December 20, 1881.

Original No. 49,254, dated August 8, 1865; antedated July 24, 1865. Application for reissue filed September 14, 1881.

*To all whom it may concern:*

Be it known that we, EDWARD J. FROST, a citizen of the United States, residing at Philadelphia, in the county of Philadelphia and State of Pennsylvania, and GEORGE A. LAWRENCE, a citizen of the United States, residing at New York, in the county and State of New York, have invented certain new and useful Improvements in Electrical Gas-Lighters; and we do hereby declare that the following is a full, clear, and exact description of the invention, which will enable others skilled in the art to which it appertains to make and use the same.

In the drawings, Figure 1 is a front view, Fig. 2 a side elevation, and Fig. 3 a cross-section, showing the valve; and Fig. 4, a side view of the valve.

The object of my invention is to obtain an economical apparatus by means of which a large number of gas-lamps may be lighted at the same time by means of an electric current.

To the ordinary gas pipe and burner A, I attach a peculiar form of valve, D, and the mechanism for opening and closing the same, consisting of two helices, B C, wound on the bobbins E E′, concentric with which is a bar of soft iron, G, playing in guides *a a′*, attached to the cross-piece *b*, which is secured to the post. The bar or cylinder G is arranged with two ends turned down very small where they pass through the guides, and the parts *d d′* on each side of the center larger for some distance, and so arranged in regard to length that one of these parts, *d d′*, shall be inside of the bobbin, while the other is between the two and nearly outside of the other. Connected with this piece is the lever *e*, which is attached at the other end of the valve D. This valve is formed of the frustum of a cone, as shown in Figs. 3 and 4, with a part of the metal turned off, so that it bears only at the two ends, and when closed over the opening through which the gas flows. These bearings *m m′* are hardened and ground to insure an accurate fit, and the valve is mounted on the screw-centers *g g′*, which are secured in the yoke H, fastened to the pipe. These centers are also hardened and support the valve, so that the only friction is between them and the hardened ends of the valve D; also, whatever wear there may be between the valve and socket which would produce leakage is overcome by loosening the screw *g* and setting up *g′*.

In the drawings, the helices B and C have each two wires, which pass to the battery and form the two poles, so that a circuit is formed whenever they are connected with it; also, connected with the wires *n n′* are the wires O O′, which form a part of the same circuit. In practice, however, only two wires will be needed, as in both cases the pipe may be used as one part of the circuit, as will be seen in the description of the operation, which is as follows: We will suppose the gas to be shut off and the mechanism in the position shown in the drawings. In order to open the valve and light the gas, the wires *n n′* are connected with the battery, so that the current passes over the wire *n*, around the helix B, and back to the battery over *n′*, thus completing the circuit and forming an electro-magnet of the coil B. This attracts into its center the cylinder G until the part *d* becomes central with it, thus, by means of the lever *e*, connected with G, opening the valve D and letting on the gas; also, the current flows on over the wire *o*, and across the small wire *p* between the poles *s s′*, to the wire O′, and back to the battery. In passing over the wire *p* sufficient heat is produced to ignite the gas. It will be seen that by this means the gas is let on before the current produces the heat at the burner, which ignites the gas, and thus a light is always sure as soon as sufficient heat is generated to ignite the gas. The wires *n n′* are now disconnected from the battery and the wires *r r′* connected, so that a current is formed around C, attracting *d′* into its center, thus closing the valve and shutting off the gas.

What we claim is—

1. The combination, with a cock arranged to control the flow of gas to a burner, of a neutral bar or armature of metal subject to magnetic induction connected with said cock, and electro-magnetic induction devices, arranged to move said bar or armature in opposite directions to operate the cock for turning on and off the gas.

2. The combination, with a turn-cock arranged to control the flow of gas to a burner, of a neutral bar or armature of magnetic metal arranged to move in opposite directions to operate said cock for turning on and off the gas, and two electric helices arranged to alternately induce electro-magnetic action upon said bar or armature for moving the same alternately in opposite directions, substantially as and for the purpose set forth.

In testimony whereof we affix our signatures in presence of two witnesses.

EDWARD J. FROST.
GEO. A. LAWRENCE.

Witnesses
W. W. DOUGHERTY,
JAS. J. KING.